US008744874B2

(12) United States Patent
Urich et al.

(10) Patent No.: US 8,744,874 B2
(45) Date of Patent: Jun. 3, 2014

(54) SYSTEMS AND METHODS FOR PERSONAL MEDICAL ACCOUNT BALANCE INQUIRIES (75) Inventors: Michael Alan Urich, Suwanee, GA (US); James Couser Rowe, III, Sugar Hill, GA (US)

(73) Assignee: NDCHealth Corporation, Atlanta, GA (US)

( * ) Notice: Subject to any disclaimer, the term of this patent is extended or adjusted under 35 U.S.C. 154(b) by 419 days.

(21) Appl. No.: 11/742,235

(22) Filed: Apr. 30, 2007

(65) Prior Publication Data

US 2007/0260486 A1 Nov. 8, 2007

Related U.S. Application Data (60) Provisional application No. 60/796,247, filed on Apr. 28, 2006.

(51) Int. Cl.
*G06Q 50/00* (2012.01)

(52) U.S. Cl.
USPC .............................................. 705/3

(58) Field of Classification Search
USPC .................................. 705/2, 3, 4
See application file for complete search history.

(56) References Cited

U.S. PATENT DOCUMENTS

| 4,491,725 | A | 1/1985 | Pritchard |
| 5,235,507 | A | 8/1993 | Sackler et al. |
| 5,628,530 | A | 5/1997 | Thornton |
| 6,012,035 | A | 1/2000 | Freeman et al. |
| 6,208,973 | B1 | 3/2001 | Boyer et al. |
| 6,757,898 | B1 | 6/2004 | Ilsen et al. |
| 6,769,228 | B1 | 8/2004 | Mahar |
| 7,155,397 | B2 | 12/2006 | Alexander et al. |
| 2002/0002495 | A1 | 1/2002 | Ullman |
| 2002/0087583 | A1 | 7/2002 | Morgan et al. |
| 2002/0111832 | A1 | 8/2002 | Judge |
| 2002/0133503 | A1 | 9/2002 | Amar et al. |
| 2002/0198831 | A1 | 12/2002 | Patricelli et al. |

(Continued)

FOREIGN PATENT DOCUMENTS

| CA | 2482370 A1 | 3/2006 |
| WO | WO 9503569 A3 | 2/1995 |
| WO | WO 0039737 A1 | 7/2000 |
| WO | WO 2007025295 A2 | 3/2007 |

OTHER PUBLICATIONS

Sampson, R.J., Taking Control of Health Care Costs, Best's Review—Life Health Insurance Edition, Nov. 1983, pp. 64-66, vol. 84, Issue 7, USA.

(Continued)

*Primary Examiner* — Elaine Gort
*Assistant Examiner* — Edward Winston, III
(74) *Attorney, Agent, or Firm* — Sutherland Asbill & Brennan LLP (57) ABSTRACT The invention is directed to systems and methods for monitoring, retrieving, and/or reporting a personal medical account balance such as an individual flexible spending account (FSA) balance. In an example of an embodiment of the invention the monitoring, retrieval, and/or display of the personal medical account balance may accompany the processing of a claim submitted by a healthcare provider (e.g., hospital, doctor's office, pharmacy, etc.) or vendor (e.g., retail store, drug store, etc.) to an insurance provider. In such embodiments, the monitoring, retrieval, and/or display of personal medical account balance may occur in real-time (or near real-time) with the submission of the claim.

12 Claims, 3 Drawing Sheets

(56) References Cited

U.S. PATENT DOCUMENTS

| | | |
|---|---|---|
| 2003/0009367 A1 | 1/2003 | Morrison |
| 2003/0050799 A1 | 3/2003 | Jay et al. |
| 2003/0149625 A1 | 8/2003 | Leonardi et al. |
| 2003/0154163 A1 | 8/2003 | Phillips et al. |
| 2003/0229540 A1 | 12/2003 | Algiene |
| 2004/0039599 A1 | 2/2004 | Fralic |
| 2004/0073457 A1 | 4/2004 | Kalies |
| 2004/0078234 A1 | 4/2004 | Tallal, Jr. |
| 2004/0078247 A1 | 4/2004 | Rowe, III et al. |
| 2004/0117323 A1 | 6/2004 | Mindala |
| 2004/0148198 A1 | 7/2004 | Kalies |
| 2004/0249745 A1 | 12/2004 | Baaren |
| 2005/0015280 A1 | 1/2005 | Gabel et al. |
| 2005/0060201 A1 | 3/2005 | Connely, III et al. |
| 2005/0102169 A1 | 5/2005 | Wilson |
| 2005/0102170 A1 | 5/2005 | Lefever et al. |
| 2005/0154627 A1 | 7/2005 | Zuzek et al. |
| 2005/0187793 A1 | 8/2005 | Myles |
| 2005/0187800 A1* | 8/2005 | Luftig ............................... 705/4 |
| 2005/0197862 A1 | 9/2005 | Paterson et al. |
| 2005/0240473 A1 | 10/2005 | Ayers, Jr. et al. |
| 2005/0267784 A1* | 12/2005 | Slen et al. .......................... 705/4 |
| 2005/0273387 A1 | 12/2005 | Previdi |
| 2005/0288972 A1 | 12/2005 | Marvin et al. |
| 2006/0020514 A1 | 1/2006 | Yered |
| 2006/0026041 A1 | 2/2006 | Ullman |
| 2006/0113376 A1* | 6/2006 | Reed et al. .................... 235/379 |
| 2006/0149784 A1 | 7/2006 | Tholl et al. |
| 2006/0184391 A1 | 8/2006 | Barre et al. |
| 2006/0259363 A1 | 11/2006 | Jhetam |
| 2006/0265251 A1 | 11/2006 | Patterson |
| 2007/0005402 A1 | 1/2007 | Kennedy et al. |
| 2007/0011025 A1 | 1/2007 | Cracchiolo et al. |
| 2007/0050209 A1 | 3/2007 | Yered |
| 2007/0136100 A1 | 6/2007 | Daugherty et al. |
| 2007/0198298 A1 | 8/2007 | Carroll |
| 2007/0233525 A1 | 10/2007 | Boyle |
| 2007/0233526 A1 | 10/2007 | Hoffman et al. |
| 2007/0239493 A1 | 10/2007 | Sweetland et al. |

OTHER PUBLICATIONS

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic; On-line Goes In-House, Chain Store Age Executive, Jan. 1987, pp. 128-32. vol. 63, Issue 1, USA.

Anonymous, TechRx Announces Successful Beta Deployment of T-Rex. PR Newswire. May 13, 2002.

Non-final Office Action for U.S. Appl. No. 12/260,779 mailed Feb. 3, 2011.

Non-final Office Action for U.S. Appl. No. 12/329,323 mailed Apr. 26, 2011.

Non-Final Office Action for U.S. Appl. No. 12/728,342 mailed Jan. 6, 2012.

Final Office Action for U.S. Appl. No. 12/728,342 mailed Sep. 27, 2012.

* cited by examiner

SYSTEMS AND METHODS FOR PERSONAL MEDICAL ACCOUNT BALANCE INQUIRIES

CROSS-REFERENCE TO RELATED APPLICATION

This application claims the benefit of priority to U.S. Provisional Patent Application Ser. No. 60/796,247 entitled, "Systems and Methods for Flexible Spending Account (FSA) Balance Inquires," which was filed in the United States Patent and Trademark Office on Apr. 28, 2006, the specification of which is hereby incorporated by reference.

FIELD OF THE INVENTION

This invention relates to financial processing of health care related transactions. More specifically, it relates to the retrieval and reporting of personal medical account balance inquiries such as flexible spending account (FSA) balances.

BACKGROUND OF THE INVENTION

Flexible spending accounts (FSAs) are tax exempt accounts where employees of sponsoring employers are able to set aside a portion of their salary to be spent on medical expenses in a given year. Expenses that are eligible to be paid by the money in a flexible spending account must be incurred within a specific term associated with the account balance (e.g., a calendar year). Any dollars not spent by the individual revert back to the sponsoring employer at the end of that calendar year. Studies have shown that a significant portion of the dollars allocated to an FSA often go unspent. Thus, there is salary not being realized by those employees who do not use up their FSA account balances in a given year.

Several reasons may exist as to why employees tend to forego spending all of the money allocated to an FSA account including the length of time between FSA qualifying transactions, the relatively low dollar value associated with the FSA account itself or with certain FSA qualified expenses, apathy in budgeting or tracking a balance associated with the account, etc. Other account holders of accounts similar to FSAs, such as Health Savings Accounts (HSAs), which are designed to help individuals save for future qualified medical and retiree health expenses on a tax-free basis, encounter similar issues to that of FSA account holders that cause their users to not utilize the full benefits of their accounts.

SUMMARY OF THE INVENTION

According to an embodiment of the invention, there is disclosed a method of electronically reporting personal medical account balances. The method includes receiving either an adjudicated claim or qualifying purchase from a pharmacy point-of-service (POS) device and identifying a personal medical account that is associated with that adjudicated claim or qualifying purchase. The method further includes retrieving, from a Flexible Spending Account (FSA) administrator system, a first account balance value associated with the personal medical account; appending a second account balance value associated with the personal medical account to an electronic message associated with the adjudicated claim or qualifying purchase; and transmitting the electronic message to the pharmacy POS device.

In accordance with one aspect of the invention, the personal medical account may be a Flexible Spending Account (FSA), Health Savings Account (HSA), Health Reimbursement Arrangement (HRA) or Retiree Reimbursement Account (RRA). According to another aspect of the invention, the step of retrieving a first account balance value associated with the personal medical account includes searching at least one database, where the database(s) contains at least one personal medical account balance value. In accordance with another aspect of the invention, the step of retrieving a first account balance value associated with the personal medical account includes requesting the account balance value associated with the personal medical account from an account administrator system.

According to yet another aspect of the invention, the method includes determining that at least some of the value of the adjudicated claim or at least some of the value of the qualifying purchase value is to be debited against the first account balance value associated with the personal medical account, and the second account balance associated with the personal medical account is calculated and stored. In accordance with another aspect of the invention, appending a second account balance value associated with the personal medical account to an electronic message associated with the adjudicated claim or qualifying purchase includes appending the second account balance value that is substantially equal to the first account balance value. According to yet another aspect of the invention, the electronic message includes receipt information. In accordance with another aspect of the invention, retrieving the first account balance value associated with the personal medical account, appending the second account balance value associated with the personal medical account to an electronic message associated with the adjudicated claim or qualifying purchase, and transmitting the electronic message all occur in real-time.

In accordance with another embodiment of the invention, there is disclosed a method of reporting personal medical account balances that includes receiving a request for an account balance associated with a personal medical account from a healthcare provider; locating the personal medical account associated with the request; retrieving account information associated with the personal medical account, where the account information includes the requested account balance; and transmitting at least the requested account balance associated with the personal medical account to the healthcare provider.

According to one aspect of the invention, the personal medical account may be an FSA, HAS, HRA or an RRA. In accordance with another aspect of the invention, locating the personal medical account associated with the request includes requesting an account balance from an account administrator system. According to yet another aspect of the invention, locating the personal medical account associated with the request includes accessing at least one database, where the database(s) contains at least one personal medical account balance. In accordance with another aspect of the invention, the healthcare provider is a pharmacy point-of-service device. According to yet another aspect of the invention, retrieving account information associated with the personal medical account and transmitting at least the requested account balance associated with the personal medical account to the healthcare provider occur in real-time.

According to yet another embodiment of the invention, there is disclosed a system for reporting personal medical account balances. The system includes at least one database, where the database(s) contains at least one personal medical account balance. The system further includes a host server in communication with the database(s), where the host server contains a processor that executes software instructions. The software instructions, when executed, retrieve, from the at least one database, a first account balance value associated with the personal medical account, append a second account balance value associated with the personal medical account to an electronic message associated with an adjudicated claim or qualifying purchase, and transmit the electronic message to a point-of-service (POS) device.

In accordance with one aspect of the invention, the personal medical account may be an FSA, HSA, HRA or an RRA. According to another aspect of the invention, the system includes an account administrator in communication with the database(s), where the account administrator periodically updates the personal medical account balance(s) located in the database(s). In accordance with yet another aspect of the invention, the software instructions for retrieving a first account balance value associated with the personal medical account include searching the database(s).

According to another aspect of the invention, the processor executes further software instructions for determining that at least some of the value of the adjudicated claim or at least some of the value of the qualifying purchase is to be debited against the first account balance value associated with the personal medical account, and the second account balance associated with the personal medical account is calculated and stored. In accordance with yet another aspect of the invention, the first account balance value and the second account balance value are substantially equal.

BRIEF DESCRIPTION OF THE FIGURES

Having thus described the invention in general terms, reference will now be made to the accompanying drawings, which are not necessarily drawn to scale, and wherein:

DETAILED DESCRIPTION OF THE INVENTION

The invention is directed to systems and methods for monitoring, retrieving, and/or reporting an individual personal medical account balance such as a flexible spending account (FSA) balance. In an example of an embodiment of the invention the monitoring, retrieval, and/or display of an FSA account balance may accompany the processing of a claim submitted by a healthcare provider (e.g., hospital, doctor's office, pharmacy, etc.) or vendor (e.g., retail store, drug store, etc.) to an insurance provider. In such embodiments, the monitoring, retrieval, and/or display of an FSA account balance may occur in real-time (or near real-time) with the submission of the claim. Accounts similar to FSAs, such as Health Savings Accounts (HSAs), Health Reimbursement Arrangements (HRAs), Retiree Reimbursement Accounts (RRAs) and other accounts associated with the payment of healthcare expenses may also utilize the invention described herein. Thus, for the purposes of the description of the invention, the descriptions of FSA account activity or information may also be synonymous with HSAs, HRAs, RRAs and/or other similar accounts associated with the payment of healthcare expenses. These accounts associated with the payment of healthcare expenses may be referred throughout this document as "personal medical accounts."

In alternative embodiments of the invention, an individual may inquire as to the balance of his/her personal medical account at the location of the healthcare provider. For instance, the individual may inquire as to the balance prior to or just after a claim has been submitted by a healthcare provider to an insurance carrier and/or a purchase is made that is considered a qualified purchase under the guidelines provided by the account administrator (e.g., an FSA administrator) and/or law. A personal medical account balance returned in a transaction message at the point of dispensing will assist the patient in utilizing the remaining funds for improved care and allow the healthcare provider (e.g., pharmacy, hospital, retail store, doctor's office, etc.) to sell additional goods and services that are eligible, for example, under an FSA program.

Example embodiments of the invention now will be described more fully hereinafter with reference to the accompanying drawings, in which example embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example embodiments of the invention are described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
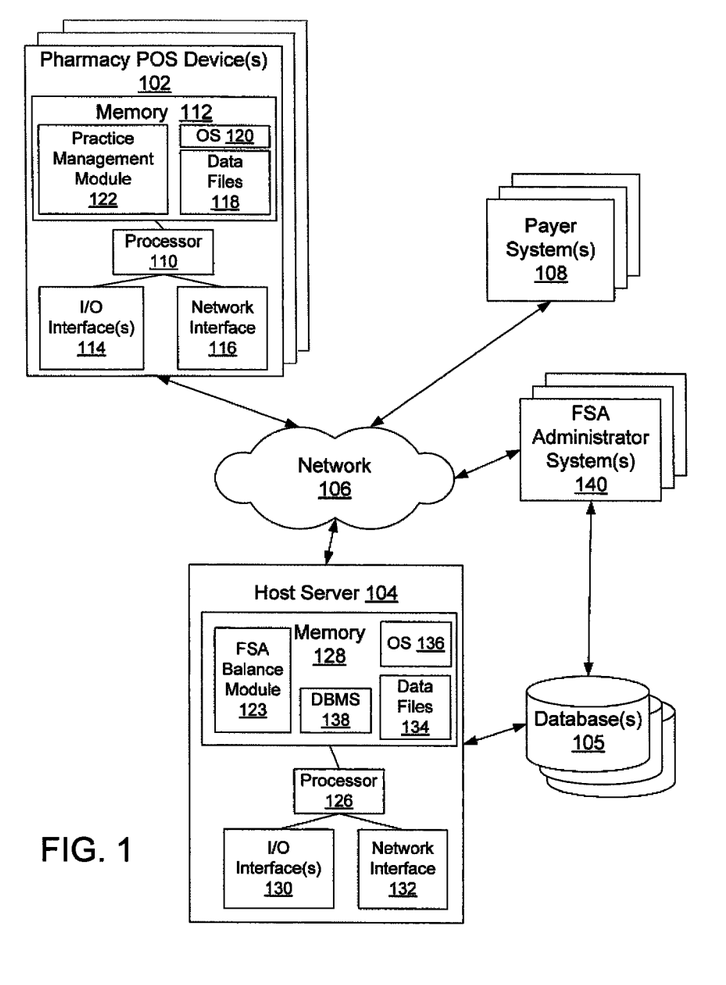
FIG. 1 shows a claim processing system in accordance with an example of an embodiment of the invention.

Example embodiments of the invention will hereinafter be described with reference to the figures, in which like numerals indicate like elements throughout the several drawings. FIG. 1 shows a claim processing system in accordance with an example of an embodiment of the invention. In particular, FIG. 1 is an example of an operating environment for implementation of certain embodiments of the invention, including a point-of-service ("POS") device such as a pharmacy POS device 102, a host server 104, a payer system 108, and an account administrator system such as an FSA administrator system 140, which are each configured for accessing and reading associated computer-readable media having stored thereon data and/or computer-executable instructions for implementing the various methods of the invention. Generally, network devices and systems include hardware and/or software for transmitting and receiving data and/or computer-executable instructions over a communications link and a memory for storing data and/or computer-executable instructions. Network devices and systems may also include a processor for processing data and executing computer-executable instructions, as well as other internal and peripheral components that are well known in the art. As used herein, the term "computer-readable medium" describes any form of memory or a propagated signal transmission medium. Propagated signals representing data and computer-executable instructions are transferred between network devices and systems.

As shown in FIG. 1, a pharmacy POS device 102 may be in communication with the host server 104 via a network 106. The pharmacy POS device 102 may be configured for receiving prescription claim data, creating claim reimbursement transactions therefrom and transmitting said claim reimbursement transactions to the host server 104. Prescription claim data includes any data that is typically provided by a patient, pharmacist and/or other healthcare provider in relation to filling a prescription (e.g., cost associated with filling the prescription, etc.) and/or requesting approval or authorization for payment from a payer or claim adjudicator. A payer may be an insurance company, a financial institution or another financial service provider. In example embodiments of the invention, the pharmacy POS device 102 may be a computer software program installed on a computer, a webpage, or a dedicated kiosk. Prescription claim data may be input to the pharmacy POS device 102 by a pharmacist or other healthcare provider or may be received by the pharmacy POS device 102 in electronic form from an electronic prescription service (not shown). The pharmacy POS device 102 may be configured for handling other types of prescription transactions.

Prescription claim transactions are electronic records or messages intended to facilitate the communication of prescription information. For example, prescription claim transactions are intended to communicate prescription claim data between pharmacies (i.e., providers) and payers. Although prescription claim transactions will be discussed hereinafter, it should be understood that the various systems and methods of the invention may be practiced in connection with other types of prescription transactions or independently of prescription transactions (e.g., raw prescription data). The content and format of a prescription claim may vary depending on which standard or protocol is used. In general, however, prescription claim transactions will identify the intended payer recipient, the drug product to be dispensed or previously dispensed, e.g., by National Drug Code number ("NDC"), the quantity to be dispensed as well as the days supply, whether the prescription claim relates to a new prescription or a refill prescription, and billing-related information.

Prescription claim transactions may be transmitted from the pharmacy POS device 102 to the host server 104 in batch, real-time or near real-time. Pharmacy POS devices can connect to the host server 104 through a variety of methods, including dial-up, frame relay or leased-line. The entire system may be supported by redundant software, communications links, and uninterruptible power supplies, thereby ensuring that all connections will provide reliable, continuous operation. The system also may ensure that all of the provider-submitted claim transactions are routed quickly, accurately, and consistently. The claim processing system substantially reduces the costs of submitting claims and speeds up providers' payment cycles.

In certain embodiments, the host server 104 may serve as a clearinghouse for multiple payer systems 108. As noted above, payer systems 108 may include systems operated by insurance companies, financial institutions and other financial service providers. In its capacity as a clearinghouse, the host server 104 is operable to parse prescription claim transactions and forward them to the appropriate payer system 108 for processing. Approval, authorization or rejection messages may be returned to the host server 104 from the payer systems 108 and such messages may be forwarded by the host server 104 to the pharmacy POS device 102.

In serving as a clearinghouse, the host server 104 may also be configured for performing pre-editing and post-editing of prescription claim transactions. Pre-editing and post-editing refers to real-time or near real-time validation and management of prescription claim data in order to maximize prescription claim reimbursement and minimize claim submission errors. Pre-editing and post-editing may generate messaging alerts and/or retrospective reports supporting "usual and customary" price comparisons, average wholesale price ("AWP") edits, dispense as written ("DAW"), brand appropriateness, and numerous other screening processes for facilitating rapid and accurate validation of prescription claims.

In accordance with an example embodiment of the invention, the host server 104, and more particularly, the FSA balance module 123, may be configured for performing certain claim screening, reporting, and editing processes for the detection and reporting of FSA account balances (or, in an alternative embodiment, other personal medical account balances) associated with a particular claim reimbursement transaction, whether it be an original submission, reversal or the resubmission of a claim. An example of a process conducted by the FSA balance module 123 in accordance with the invention is described in further detail below with reference to FIG. 2. A pharmacy seeking reimbursement uses the FSA balance module 123 to assist its customers in utilizing the remaining FSA funds for improved care and to allow the pharmacy to sell additional goods and services that are eligible under an FSA program. Therefore, the FSA balance module 123 may comprise computer-executable instructions for performing various processes for retrieving, reviewing, storing and possibly editing FSA account information associated with reimbursement claims, as well as managing related messaging and reporting functions regarding the FSA account balances transmitted to the pharmacy POS devices 102.

The host server 104 intercepts claims adjudicated by the payer system 108, and the FSA balance module 123 parses and examines the claim's contents. The FSA balance module 123 then determines if the claim is associated with an FSA account stored in one or more accessible databases 105. In the example embodiment of FIG. 1, the FSA account information stored in the database(s) 105 is updated, periodically or otherwise, by an FSA administrator system 140. An FSA administrator system 140 may be an insurance and/or financial services provider that administers FSA accounts for employers and/or other organizations as well as handles the management of its individual FSA accounts. FSA debit transactions typically are communicated over an Electronic Funds transfer (EFT) network as are other financial transactions. The debiting and crediting of the individual accounts are typically handled by the FSA administrator system 140. In an alternative embodiment of the invention, the FSA balance module 123 may instruct the host server 104 to communicate with one or more FSA administrator systems 140 to retrieve FSA account information associated with an adjudicated claim.

Once the FSA account information has been located, the FSA balance module 123 may access that information and retrieve the account balance information associated with that FSA account. The FSA balance module 123 may then append the account balance to a message to be included in the reporting of the reimbursed claim transaction to the pharmacy POS device 102. In other embodiments, the FSA balance module 123 may perform additional checks and calculations involving the FSA account information. For example, the FSA balance module 123 may determine if the current adjudicated claim transaction qualifies for at least partial FSA account debiting. This determination may require review of FSA information stored in one of the databases 105 and/or may involve retrieving such information from the FSA administrator system 140. If it is determined that the transaction does qualify for FSA account debiting and that the current FSA account balance does not yet reflect the adjudicated claim transaction, then the FSA balance module 123 may calculate the new FSA account balance and append that balance to the message to be included in the reporting of the reimbursed claim transaction to the pharmacy POS device 102. The FSA balance module 123 may also utilize and/or include additional FSA account information in the message reported to the pharmacy POS device 102 (e.g., account number, previous balances, account debit/credit history, account holder's name, patient's name). The messages generated may also include qualifying purchase information. Qualifying purchase information may include the name and/or category of the specific medical expense debited against the FSA account. The generated messages may also include suggested additional qualifying purchases, warnings about the expiration of the term (e.g., annual limit) associated with the FSA account balance, FSA administrator contact information, or other FSA related information that may be helpful in assisting the pharmacy customer in utilizing the remaining funds for improved care and allow the pharmacy to sell additional goods and services that are eligible under an FSA program.

Referring again to FIG. 1, it will be appreciated that the pharmacy POS device 102 may be any processor-driven device, such as a personal computer, laptop computer, handheld computer and the like. In addition to a processor 110, the pharmacy POS device 102 may further include a memory 112, input/output ("I/O") interface(s) 114 and a network interface 116. The memory 112 may store data files 118 and various program modules, such as an operating system ("OS") 120 and a practice management module 122. The practice management module 122 may comprise computer-executable instructions for performing various routines, such as those for creating and submitting prescription claim transactions. I/O interface(s) 114 facilitate communication between the processor 110 and various I/O devices, such as a keyboard, mouse, printer, microphone, speaker, monitor, etc. The network interface 116 may take any of a number of forms, such as a network interface card, a modem, etc. These and other components of the pharmacy POS device 102 will be apparent to those of ordinary skill in the art and are therefore not discussed in more detail herein.

Similarly, the host server 104 may be any processor-driven device that is configured for receiving and fulfilling requests related to prescription claim transactions. The host server 104 may therefore include a processor 126, a memory 128, input/output ("I/O") interface(s) 130 and a network interface 132. The memory 128 may store data files 134 and various program modules, such as an operating system ("OS") 136, a database management system ("DBMS") 138 and the FSA balance module 123. The host server 104 may include additional program modules (not shown) for performing other pre-editing or post-editing methods and for providing clearinghouse services. Those skilled in the art will appreciate that the host server 104 may include alternate and/or additional components, hardware or software. In addition, the host server 104 may be connected to a local or wide area network (not shown) that includes other devices, such as routers, firewalls, gateways, etc.

The host server 104 may include or be in communication with one or more databases 105. The databases 105 may store, for example, data relating to FSA accounts and FSA account holders, data relating to pharmacies, payers, state prescription laws, prescription drugs, formularies, and consumers, such as typical doses filled by consumers, typical drugs prescribed by doctors, most common daily dose values, common daily dose values, likelihood indicators and other data used in the various claim screening and editing processes described herein after. The databases 105 may also store reports and other data relating to the results of the claim screening and edit processes. The databases 105 may also store any other data used or generated by the host server 104 or FSA balance module 123, such as data used in other pre-editing and post-editing methods and reports generated thereby. Although a single database 105 may be utilized, those skilled in the art will appreciate that multiple physical and/or logical databases may be used to store the above mentioned data. For security, the host server 104 may have a dedicated connection to one or more databases 105, as shown. However, the host server 104 may also communicate with one or more databases 105 via a network 106.

The network 106 may comprise any telecommunication and/or data network, whether public or private, such as a local area network, a wide area network, an intranet, an internet and/or any combination thereof and may be wired and/or wireless. Due to network connectivity, various methodologies as described herein may be practiced in the context of distributed computing environments. Although the pharmacy POS device 102 is shown for simplicity as being in communication with the host server 104 via one intervening network 106, it is to be understood that any other network configuration is possible. For example, the pharmacy POS device 102 may be connected to a pharmacy's local or wide area network, which may include other devices, such as gateways and routers, for interfacing with another public or private network 106. Instead of or in addition to a network 106, dedicated communication links may be used to connect the various devices of the example embodiment of the invention.

Those skilled in the art will appreciate that the operating environment shown in and described with respect to FIG. 1 is provided by way of example only. Numerous other operating environments, system architectures and device configurations are possible. For example, the invention may in certain embodiments be implemented in a non-networked environment, in which a stand-alone pharmacy POS device 102 executes one or more FSA balance module(s) 123. Accordingly, the an example embodiment of the invention should not be construed as being limited to any particular operating environment, system architecture or device configuration.

Using the claim processing system, providers can transmit in real-time provider-submitted claims to an appropriate payer and return a claim approval or rejection within seconds. Thus, the claim processing system can streamline provider claim processing operations and increase productivity for both providers and benefit plans. To enable the provider to input claims for electronic transmission to the claim processing system and payer, the pharmacy POS device 102 may comprise software that receives claim data entered by a user through a graphical user interface (GUI). According to one aspect of the invention, no claim processing software resides on the pharmacy POS device 102, other than an Internet browser, because the GUI and one or more interfaces for inputting claim data are stored by the claim processing system and remotely accessible by the pharmacy POS device 102 via an Internet connection, satellite or cellular network, LAN, WAN, or the like. The GUI information such as a patient's name, birth date, address, telephone number and other identifying information is entered with claim-specific information, such as drug prescription or medical service or procedure. The identity of the pharmacy is also included in the claim data along with additional information known to those of ordinary skill in the art.

According to one aspect of the invention, the claim data fields are defined by a particular payer such that the pharmacy POS device 102 should provide only the claim data requested by the payer to which the claim is transmitted. According to another aspect of the invention, the claim data is defined by a pre-established standard or transaction format well known to those of skill in the art. Once the claim is entered, it is transmitted to the host server 104 via any of the methods described above. The claim is then edited by the host server 104 and/or forwarded by the host server 104 to the appropriate payer system 108. In an example of an embodiment of the invention, the claim processing system, and more particularly, the host server 104, is an all-payer solution allowing providers to use a single application to connect to key government and commercial payers across the country. Once the appropriate payer has adjudicated the claim it is sent back to the host server, where the FSA balance module 123 can process the adjudicated claim, which is explained in further detail with reference to FIG. 2 below.

Figure 2:
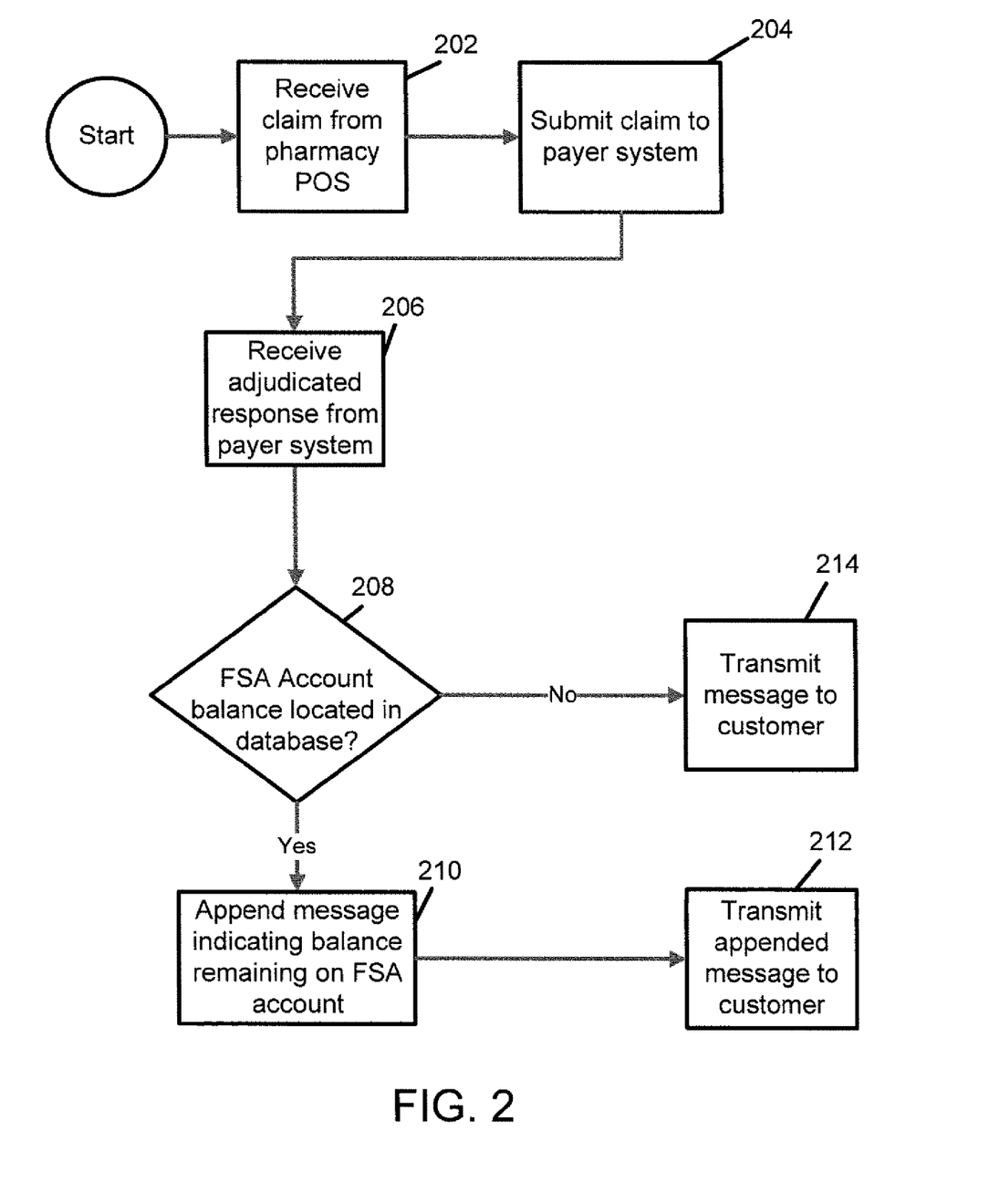
FIG. 2 shows a block diagram flowchart showing the process of appending personal medical account balances, such as FSAs, to processed claims in accordance with an example of an embodiment of the invention.

FIG. 2 shows a block diagram flowchart showing the process of appending personal medical account balances, such as FSAs, to processed claims in accordance with an example of an embodiment of the invention. As shown in the example embodiment of FIG. 2, the process starts at step 202 where a claim (or qualifying purchase) is submitted from a healthcare provider (e.g., pharmacy) to a third party processor (e.g., a host server). Typically, a pharmacy submits the claim electronically via a network to a host server for various data editing, formatting, and/or manipulation. At step 204 the host server electronically forwards along the claim submission to the relevant payer system for claim adjudication. In alternative embodiments the host server may perform little or no data editing, formatting, and/or manipulation prior to submitting the claim to the payer system. At the payer system the claim is adjudicated. During adjudication, the cost associated with the claim is reviewed to determine the proper reimbursement amount to be paid by the payer system and the payer system pays the appropriate amount. After the claim has been adjudicated by the payer system then step 206 is invoked where the adjudicated claim is electronically transferred back to the host server where it is received.

At this point, step 208 is invoked where the host server determines if an FSA account is associated with the adjudicated claim. In the example embodiment of the invention shown in FIG. 2, one or more databases maintained by an FSA administrator or other independent party, and accessible by the host server, are searched for FSA accounts that are associated with adjudicated claim. The information that may be used to assist in locating the relevant FSA account may include information extracted from the adjudicated claim information, which may include one or more of: a patient's name, patient's ID number, doctor's name, patient or doctor addresses, FSA account numbers, insurance information, or any other information that may be used to identify the patient for whom the adjudicated claim was processed. Once the patient has been identified an associated FSA account information stored in one of the databases may be looked up and the FSA account balance may be retrieved.

In an alternative embodiment of the invention the FSA account information may be requested from and provided by an FSA administrator system (or other independent party) in communication with the host server. In such an embodiment, the host server may transmit patient information as an inquiry to the FSA administrator system for it to retrieve the FSA account information and forward that information to the host server. In another embodiment, the payer system may include FSA account information with its adjudicated claim response sent to the host server.

In the example embodiment shown in FIG. 2, if an account balance is located, the account balance is retrieved and step 210 is invoked where the retrieved account balance is appended to an electronic message that is associated with the adjudicated claim. In an example of an embodiment of the invention the electronic message contains information pertaining to the adjudicated claim and FSA account information (e.g., the account balance). Step 212 is invoked to send the appended message to the pharmacy. If an account balance is not located in the databases (or by the FSA administrator), an error occurs in the search process, or the account information is otherwise unavailable, then step 214 is invoked to send the adjudicated claim message to the pharmacy without an FSA account balance appended to the message.

In the example embodiment of FIG. 2, the account balance as it was retrieved from the database is appended to the adjudicated claim message to be sent to the pharmacy (and ultimately to the patient/customer). In other embodiments, additional information and/or additional processing may also be conducted to ensure that the FSA account balance retrieved from the database or received from the FSA administrator system (or other party) is the most updated account balance prior to transmitting the FSA account balance to the pharmacy. For example, the determination may be made if the adjudicated claim itself qualified as an FSA expense or otherwise to be debited (in whole or in part) against the retrieved FSA account balance. If it is determined that at least a portion (e.g., co-pay) of the adjudicated claim value is to be (or was) debited against the FSA account then the host server may calculate the FSA account balance after the transaction and append the account balance reflecting the debit associated with the adjudicated claim to the message to be sent to the pharmacy. For example, the appended message may include the following information which may be electronically stored and/or printed on a receipt:

PREVIOUS FSA ACCOUNT BALANCE: $100
DEBIT: $20 (Prescription Co-Pay)
REMAINING FSA ACCOUNT BALANCE: $80

Figure 3:
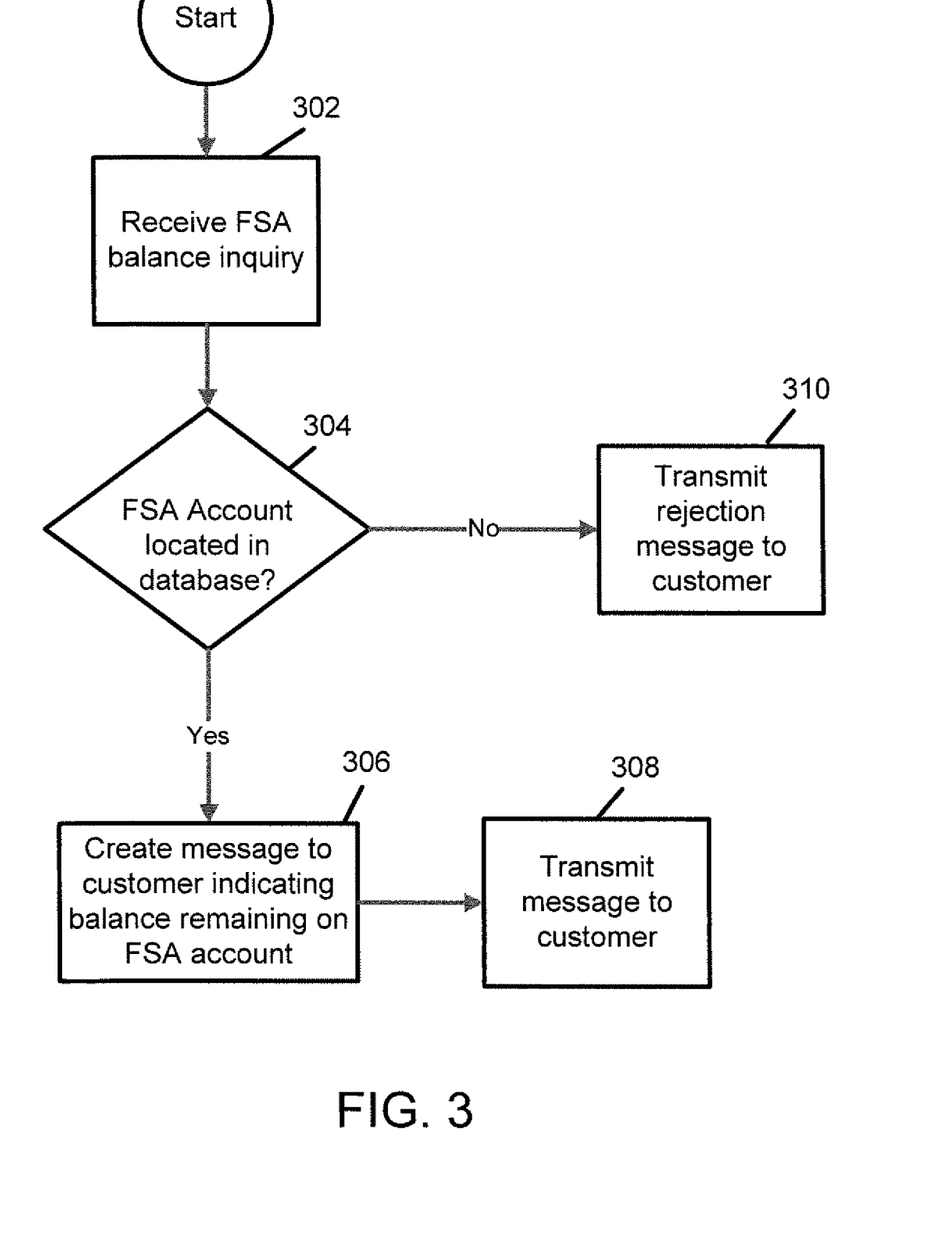
FIG. 3 shows a block diagram flowchart showing the process of retrieving an individual personal medical account balance, such as an FSA account balance, in accordance with an example of an embodiment of the invention.

FIG. 3 shows a block diagram flowchart showing the process of retrieving an individual personal medical account balance, such as an FSA account balance, in accordance with an example of an embodiment of the invention. As shown in the example embodiment of FIG. 3, the process starts at step 302 where a host server receives an FSA balance inquiry from a healthcare provider. For example, a balance inquiry may be electronically received from a pharmacy point-of-service device. Next, step 304 is invoked to determine if the requested FSA account balance is located in any of the databases accessible by the host server. In alternative embodiments, the search for the requested account balance may include requesting the account balance from an FSA administrator system. If an account balance is located, the account balance is retrieved and step 306 is invoked where a message is created that includes the account balance and step 308 is invoked to send the message to the customer. If an account balance is not located in the databases (or by the FSA administrator), an error occurs in the search process, or the account information is otherwise unavailable, then step 310 is invoked to send a rejection message to the customer notifying the customer that the request for FSA account balance information failed, was unavailable, and/or was not located. In the example embodiment of FIG. 3, the FSA account balance retrieval and transmission to the customer may occur in real-time.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

That which is claimed:

1. A method of electronically reporting personal medical account balances comprising:
   receiving, at a host server associated with a third-party processor, an adjudicated claim from a payer system;
   identifying, by the host server, a personal medical account associated with the adjudicated claim;
   retrieving, by the host server, from a Flexible Spending Account (FSA) administrator system, a first account balance value associated with the personal medical account;
   identifying, by the host server, at least a portion of the adjudicated claim qualifying as a personal medical account expense;
   appending, by the host server, an electronic message associated with the adjudicated claim, the electronic message including at least the first account balance, an amount associated with the portion of the adjudicated claim qualifying as the personal medical account expense, and a second account balance reflecting a debit associated with the amount associated with the portion of the adjudicated claim qualifying as the personal medical account expense; and
   transmitting the electronic message to a pharmacy point-of-service (POS) device.

2. The method of claim 1, wherein identifying a personal medical account associated with the adjudicated claim includes that the personal medical account comprises one of a Flexible Spending Account (FSA), Health Savings Account (HSA), Health Reimbursement Arrangement (HRA), or Retiree Reimbursement Account (RRA).

3. The method of claim 1, wherein retrieving a first account balance value associated with the personal medical account includes searching at least one database, wherein the at least one database contains at least one personal medical account balance value.

4. The method of claim 1, wherein retrieving a first account balance value associated with the personal medical account includes requesting the account balance value associated with the personal medical account from an account administrator system.

5. The method of claim 1, further comprising storing the second account balance value.

6. The method of claim 1, wherein transmitting the electronic message to the pharmacy POS device includes transmitting receipt information.

7. The method of claim 1, wherein retrieving the first account balance value associated with the personal medical account, appending the electronic message associated with the adjudicated claim, and transmitting the electronic message occur in real-time.

8. A system for reporting personal medical account balances comprising:
   at least one database, wherein the at least one database contains at least one personal medical account balance; and
   a host server associated with a third-party processor and in communication with the at least one database, wherein the host server contains a processor that executes software instructions for:
      receiving an adjudicated claim from a payer system;
      identifying a personal medical account associated with the adjudicated claim;
      retrieving, from the at least one database, a first account balance value associated with the personal medical account;
      identifying, by the host server, at least a portion of the adjudicated claim qualifying as a personal medical account expense;
      appending an electronic message associated with the adjudicated claim, the electronic message including at least the first account balance, an amount associated with the portion of the adjudicated claim qualifying as the personal medical account expense, and a second account balance reflecting a debit associated with the amount associated with the portion of the adjudicated claim qualifying as the personal medical account expense; and
      transmitting the electronic message to a point-of-service (POS) device.

9. The system of claim 8, wherein the personal medical account comprises one of a Flexible Spending Account (FSA), Health Savings Account (HSA), Health Reimbursement Arrangement (HRA), or Retiree Reimbursement Account (RRA).

10. The system of claim 8, further comprising an account administrator in communication with the at least one database, wherein the account administrator periodically updates the at least one personal medical account balance located in the at least one database.

11. The system of claim 8, wherein the software instructions for retrieving a first account balance value associated with the personal medical account include searching the at least one database.

12. The system of claim 8, wherein the processor executes further software instructions for:
   storing the second account balance value.

\* \* \* \* \*